United States Patent
Agano

(10) Patent No.: US 6,573,507 B1
(45) Date of Patent: Jun. 3, 2003

(54) RADIATION IMAGE READ-OUT METHOD AND APPARATUS WITH TRANSFORMED PIXEL DENSITY BASED ON RADIATION IMAGE SIZE

(75) Inventor: Toshitaka Agano, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/472,960

(22) Filed: Dec. 27, 1999

(30) Foreign Application Priority Data

Dec. 24, 1998 (JP) .......................... 10-366160

(51) Int. Cl.$^7$ ............... G01T 1/24; H01L 25/00; H01L 27/00
(52) U.S. Cl. ............... 250/370.09; 250/370.11
(58) Field of Search ............... 250/370.09, 370.11

(56) References Cited

U.S. PATENT DOCUMENTS

| | | | |
|---|---|---|---|
| 4,684,991 A | | 8/1987 | Forchheimer et al. . 358/213.11 |
| 4,788,593 A | * | 11/1988 | Ovshinsky ................... 348/294 |
| 4,803,359 A | | 2/1989 | Hosoi et al. ............. 250/327.2 |
| 5,187,369 A | | 2/1993 | Kingsley et al. ........ 250/370.11 |
| 5,340,988 A | * | 8/1994 | Kingsley ............... 250/370.09 |
| 5,363,213 A | | 11/1994 | Coward et al. ............. 358/455 |
| 5,608,774 A | | 3/1997 | Polichar et al. ............ 378/98.8 |
| 6,028,968 A | * | 2/2000 | Kurita et al. ................ 382/298 |
| 6,292,218 B1 | * | 9/2001 | Parulski et al. ............. 348/220 |

FOREIGN PATENT DOCUMENTS

| | | | | |
|---|---|---|---|---|
| EP | 0 844 588 A2 | 5/1998 | ............. | G06T/3/40 |
| JP | 59-211263 | 11/1984 | ........... | H01L/27/14 |
| JP | 1-216290 | 8/1989 | ............. | G01T/1/24 |
| JP | 2-164067 | 6/1990 | ......... | H01L/27/146 |
| JP | 10-232824 | 9/1998 | ........... | G06F/12/06 |
| WO | 92-06501 | 4/1992 | ........... | H01L/27/14 |

OTHER PUBLICATIONS

Antonuk, L. et al, "Signal noise, and readout considerations in the decelopment of amorphous silicon photodiode arrays for radiotherapy and diagnostic x–ray imaging", SPIE vol. 1443, Medical Imaging V:Image Physics (1991), pp. 108–119.

Naruse, Y. et al, "Metal/Amorphous Silicon Multilayer Radiation Detectors", IEEE Transactions On Nuclear Science, vol. 36, No. 2, Apr. 1989.

S. Mruetusatorn et al.; "Conversion of Image Resolutions for High Quality Visual Communication"; vol. E76–D; No. 2; Feb. 1993; pp. 251–257.

* cited by examiner

Primary Examiner—Georgia Epps
Assistant Examiner—Alicia M. Harrington
(74) Attorney, Agent, or Firm—Sughrue Mion, PLLC

(57) ABSTRACT

A radiation image read-out method includes obtaining an image signal, which represents a radiation image, from a solid-state radiation detector constituted of a plurality of solid-state detecting devices for detecting radiation, which are arrayed in a matrix-like form along a main scanning direction and a sub-scanning direction and each of which corresponds to one pixel. A pixel density transforming process is performed on the image signal and in accordance with a pixel size, which is determined in accordance with a desired image size in cases where read-out processing is performed with respect to different image sizes, a read-out density of a solid-state radiation detector need not be altered, but the method can cope with narrowness of an allowable width of the number of pixels in an image reproducing apparatus or an image filing apparatus.

6 Claims, 6 Drawing Sheets

FIG.2

MAIN SCANNING DIRECTION →

SUB-SCANNING DIRECTION ↓

| $X_{11}$ | $X_{12}$ | $X_{13}$ | $X_{14}$ | $X_{15}$ | $X_{16}$ | $X_{17}$ | $X_{18}$ |
|---|---|---|---|---|---|---|---|
| $X_{21}$ | $X_{22}$ | $X_{23}$ | $X_{24}$ | $X_{25}$ | $X_{26}$ | $X_{27}$ | $X_{28}$ |
| $X_{31}$ | $X_{32}$ | $X_{33}$ | $X_{34}$ | $X_{35}$ | $X_{36}$ | $X_{37}$ | $X_{38}$ |
| $X_{41}$ | $X_{42}$ | $X_{43}$ | $X_{44}$ | $X_{45}$ | $X_{46}$ | $X_{47}$ | $X_{48}$ |
| $X_{51}$ | $X_{52}$ | $X_{53}$ | $X_{54}$ | $X_{55}$ | $X_{56}$ | $X_{57}$ | $X_{58}$ |
| $X_{61}$ | $X_{62}$ | $X_{63}$ | $X_{64}$ | $X_{65}$ | $X_{66}$ | $X_{67}$ | $X_{68}$ |
| $X_{71}$ | $X_{72}$ | $X_{73}$ | $X_{74}$ | $X_{75}$ | $X_{76}$ | $X_{77}$ | $X_{78}$ |
| $X_{81}$ | $X_{82}$ | $X_{83}$ | $X_{84}$ | $X_{85}$ | $X_{86}$ | $X_{87}$ | $X_{88}$ |

- PIXEL POSITION BEFORE TRANSFORMATION
- ○ PIXEL POSITION AFTER TRANSFORMATION

RADIATION IMAGE READ-OUT METHOD AND APPARATUS WITH TRANSFORMED PIXEL DENSITY BASED ON RADIATION IMAGE SIZE

BACKGROUND OF THE INVENTION

1. Field of the Invention

This invention relates to a radiation image read-out method and apparatus for obtaining an image signal which represents a radiation image, from a solid-state radiation detector, which converts incident radiation into an electric signal. This invention also relates to a solid-state radiation detector for use in the radiation image read-out method and apparatus.

2. Description of the Prior Art

Radiation image recording and read-out apparatuses utilizing radiation film or stimulable phosphor sheets have heretofore been used widely for obtaining radiation images for medical diagnosis, or the like.

Also, recently, various radiation image recording and read-out apparatuses utilizing solid-state radiation detectors (comprising semiconductors as major parts), which detect radiation and feed out image signals, have been proposed and have widely been used in practice. As the solid-state radiation detectors utilized in the radiation image recording and read-out apparatuses, various types of solid-state radiation detectors have been proposed. Typical examples of the solid-state radiation detectors include photo conversion types or direct conversion types of solid-state radiation detectors, in which accumulated electric charges (also referred to as the latent image charges) carrying image information are detected with thin-film transistors (TFT's), and improved direct conversion types of solid-state radiation detectors, in which the latent image charges carrying image information are detected by scanning with reading light.

The photo conversion types of solid-state radiation detectors comprise solid-state detection means (two-dimensional image read-out means) and a fluorescent material overlaid upon the solid-state detection means. The solid-state detection means comprises an insulating substrate and a plurality of photoelectric conversion devices, which are formed in a two-dimensional pattern on the insulating substrate and which are provided with charge accumulating sections for accumulating electric charges. When the fluorescent material is exposed to radiation carrying image information, it converts the radiation into the fluorescence. The fluorescence is detected, and the thus obtained electric charges are accumulated at the charge accumulating sections of the photoelectric conversion devices. The TFT's, each of which is connected to one of the photoelectric conversion devices, are operated successively, and the accumulated charges are thereby converted into a radiation image signal and fed out. The photo conversion types of solid-state radiation detectors are described in, for example, Japanese Unexamined Patent Publication Nos. 59(1984)-211263 and 2(1990)-164067, PCT International Publication No. WO92/06501, and SPIE Vol. 1443, Medical Imaging V; Image Physics (1991), pp. 108–119.

The direct conversion types of solid-state radiation detectors comprise solid-state detection means and a radio-conductive material overlaid upon the solid-state detection means. The solid-state detection means comprises an insulating substrate and a plurality of charge collecting electrodes, which are formed in a two-dimensional pattern on the insulating substrate and each of which corresponds to one pixel. When the radio-conductive material is exposed to radiation carrying image information, it generates electric charges carrying the image information. The direct conversion types of solid-state radiation detectors are described in, for example, "Material Parameters in Thick Hydrogenated Amorphous Silicon Radiation Detectors," Lawrence Berkeley Laboratory, University of California, Berkeley, Calif. 94720 Xerox Parc. Palo Alto. Calif. 94304; "Metal/Amorphous Silicon Multilayer Radiation Detectors, IEE TRANSACTIONS ON NUCLEAR SCIENCE, Vol. 36, No. 2, April 1989; and Japanese Unexamined Patent Publication No. 1(1989)-216290. In the direct conversion types of solid-state radiation detectors, solid-state detecting devices comprise the charge collecting electrodes and the radio-conductive material as the major parts. When the accumulated charges carrying the radiation image information are to be detected as an image signal from the direct conversion types of solid-state radiation detectors, as in the aforesaid photo conversion types of solid-state radiation detectors, the solid-state detecting devices are scanned with the TFT's, each of which is connected to one of the solid-state detecting devices.

The improved direct conversion types of solid-state radiation detectors have been proposed by the applicant in Japanese Patent Application No. 10(1998)-232824. The improved direct conversion types of solid-state radiation detectors are improved over the direct conversion types of solid-state radiation detectors and utilize a photo reading technique for performing the reading operation by the scanning with reading light. The improved direct conversion types of solid-state radiation detectors comprise:

i) a first electrical conductor layer having permeability to recording radiation, ii) a recording photo-conductive layer, which exhibits photo-conductivity (in the strict sense, radio-conductivity) when it is exposed to the recording radiation having passed through the first electrical conductor layer, iii) a charge transporting layer, which acts approximately as an insulator with respect to electric charges having a polarity identical with the polarity of electric charges occurring in the first electrical conductor layer, and which acts approximately as a conductor with respect to electric charges having a polarity opposite to the polarity of the electric charges occurring in the first electrical conductor layer, iv) a reading photo-conductive layer, which exhibits photo-conductivity (in the strict sense, electromagnetic wave conductivity) when it is exposed to a reading electromagnetic wave, and v) a second electrical conductor layer having permeability to the reading electromagnetic wave, the layers being overlaid in this order. In the improved direct conversion types of solid-state radiation detectors, latent image charges carrying image information are accumulated at an interface between the recording photo-conductive layer and the charge transporting layer. The first electrical conductor layer and the second electrical conductor layer act as electrodes. Also, in the improved direct conversion types of solid-state radiation detectors, solid-state detecting devices comprise the recording photo-conductive layer, the charge transporting layer, and the reading photo-conductive layer as the major parts.

In the improved direct conversion types of solid-state radiation detectors, the reading of the latent image charges (i.e., the reading of the electrostatic latent image represented by the latent image charges) may be performed with a technique, wherein the second electrical conductor layer (i.e., a reading electrode) is constituted of a flat plate-shaped electrode, and the reading electrode is scanned with spot-like reading light, such as a laser beam, the latent image charges being thereby detected. Alternatively, the latent image charges may be read with a technique, wherein the reading electrode is constituted of comb tooth-shaped electrodes (i.e., stripe-shaped electrodes), and the stripe-shaped electrodes are scanned with light, which is produced by a line light source extending along a direction approximately normal to the longitudinal direction of each stripe-shaped electrode, the scanning with the light being performed in the longitudinal direction of each stripe-shaped electrode. In this manner, the latent image charges are detected. In cases where either one of the reading techniques is employed, the solid-state radiation detector is formed as a two-dimensional solid-state radiation detector constituted of a plurality of solid-state detecting devices, which are arrayed in a substantially matrix-like form and each of which corresponds to one pixel. Specifically, as for the solid-state radiation detector itself, it cannot be said that the individual solid-state detecting devices are arrayed in a matrix-like form. However, in the step of processing the image signal obtained by reading the latent image charges, for example, a signal component at a sampling point can be regarded as a signal component representing a predetermined pixel. Therefore, the solid-state detecting devices are referred to as being arrayed in a "substantially" matrix-like form. In cases where the reading electrode is constituted of the stripe-shaped electrodes, with respect to the direction in which the stripe-shaped electrodes stand side by side, each stripe-shaped electrode itself corresponds to a pixel.

Each of the various types of solid-state radiation detectors described above comprises a plurality of solid-state detecting devices for converting radiation into an electric signal, which are arrayed in a matrix-like form. Each type of solid-state radiation detector described above feeds out an image signal, which represents a radiation image, as two-dimensional matrix information.

In cases where radiation images are read out by utilizing the solid-state radiation detectors, the solid-state radiation detectors of various different image sizes are often utilized in accordance with the portion of an object the image of which is recorded, the image recording mode used, and the like.

Alteration of the image size is ordinarily performed by changing the total number of the solid-state detecting devices constituting the solid-state radiation detector, while the size of the detection region per pixel (hereinbelow referred to as the pixel size), which is determined by the array pitch of the solid-state detecting devices, and the like, being kept unchanged, i.e. while the read-out density (the pixel density) of the solid-state radiation detector being kept unchanged. Specifically, the image size is altered by setting how many solid-state detecting devices of an identical pixel size are arrayed. Therefore, the total number of pixels varies for different image sizes. Also, in accordance with the variation of the total number of pixels, the total number of pixels, which are read out, varies.

Ordinarily, in output apparatuses, such as printers and monitors, for reproducing (outputting) visible radiation images in accordance with read-out image signals, which have been obtained from the solid-state radiation detectors, and image filing apparatuses for filing the radiation images (both apparatuses will hereinbelow be referred to as the radiation image read-out apparatuses), the number of pixels in each of the reproduced images or the filed images is fixed at a predetermined value or is variable only in a narrow range.

Therefore, in cases where read-out processing is performed with respect to solid-state radiation detectors of different image sizes, for example, while the read-out densities of the solid-state radiation detectors are being unchanged, it becomes necessary for the read-out image signals having been obtained from the solid-state radiation detectors to be processed such that, as the image size of the solid-state radiation detector becomes large, the pixel density may be set to be low. In this manner, regardless of the image sizes of the solid-state radiation detectors, the number of pixels in each of the reproduced images or the filed images must be set at a predetermined value or approximately at the predetermined value, and the image sizes of the reproduced images or the filed images must thereby be set approximately at a predetermined size. Thus it becomes necessary for the number of pixels in the image, which is represented by the read-out image signal having been obtained from the solid-state radiation detector, to be altered in accordance with the image size, which is required from the aspect of image reproduction or image filing.

Also, in a built-in type of radiation image recording and read-out apparatus having a solid-state radiation detector fixedly, a solid-state radiation detector for the maximum image size is ordinarily built in the radiation image recording and read-out apparatus. With the built-in type of radiation image recording and read-out apparatus, in cases where an operation for recording an image of an image size smaller than the maximum image size is performed, only the image signal corresponding to the region within the specified read-out image size is processed as an effective image signal. Such a technique is referred to as the logical readout. In cases where the logical readout is performed, as in the cases described above, it becomes necessary for the number of pixels in the image, which is represented by the read-out image signal having been obtained from the solid-state radiation detector, to be altered in accordance with the image size, which is required,from the aspect of image reproduction or image filing.

SUMMARY OF THE INVENTION

The primary object of the present invention is to provide a radiation image read-out method in which, in cases where read-out processing is performed with respect to different image sizes, a read-out density of a solid-state radiation detector need not be altered but which is capable of coping with narrowness of an allowable width of a number of pixels in an image reproducing apparatus or an image filing apparatus.

Another object of the present invention is to provide an apparatus for carrying out the radiation image read-out method.

The specific object of the present invention is to provide a solid-state radiation detector for use in the radiation image read-out method and apparatus.

The present invention provides a radiation image read-out method, comprising the steps of obtaining an image signal, which represents a radiation image, from a solid-state radiation detector constituted of a plurality of solid-state detecting devices for detecting radiation, which are arrayed in a matrix-like form along a main scanning direction and a sub-scanning direction and each of which corresponds to one pixel, wherein the improvement comprises the step of performing a pixel density transforming process on the image signal and in accordance with a pixel size, which is determined in accordance with a desired image size.

In the radiation image read-out method in accordance with the present invention, the pixel density transforming process should preferably be performed in accordance with a pixel density of an output apparatus, such as a printer, which receives an image signal having been obtained from the pixel density transforming process. For example, in cases where a pixel size of each of the solid-state detecting devices falls within the range of 100 $\mu$m to 200 $\mu$m, the pixel density transforming process should preferably be performed such that a pixel size in an image outputted from the output apparatus falls within the range of 40 $\mu$m to 100 $\mu$m. In such cases, the pixel density transforming process should more preferably be performed such that the pixel size in the image outputted from the output apparatus falls within the range of 70 $\mu$m to 90 $\mu$m. As in the correspondence relationship between the pixel size of each of the solid-state detecting devices of the solid-state radiation detector, the pixel density of the output apparatus and the pixel size in the image outputted from the output apparatus have the correspondence relationship such that, if one of the pixel density and the pixel size is determined, the other of the pixel density and the pixel size will be determined.

The radiation image read-out method in accordance with the present invention should preferably be modified such that, as an effective image size of the solid-state radiation detector becomes large, a magnification ratio of pixel density transformation in the pixel density transforming process is set to be low with respect to each of a row direction and a column direction.

Also, the radiation image read-out method in accordance with the present invention should preferably be modified such that the pixel density transforming process is performed such that, with respect to each of a row direction and a column direction, a magnification ratio of pixel density transformation is equal to n/m, where n represents a positive integral number and m represents a positive integral number equal to at most a number of pixels of the solid-state detecting devices along the main scanning direction or the sub-scanning direction. The term "number of pixels of solid-state detecting devices along a main scanning direction or a sub-scanning direction" as used herein means the total number of pixels along each of the main scanning direction and the sub-scanning direction of the effective image size of the solid-state radiation detector. The main scanning direction may be taken as the row direction, and the sub-scanning direction may be taken as the column direction. Alternatively, the main scanning direction may be taken as the column direction, and the sub-scanning direction may be taken as the row direction. Also, the magnification ratio of pixel density transformation with respect to the row direction and the magnification ratio of pixel density transformation with respect to the column direction may be identical with each other or may be different from each other.

Further, in the radiation image read-out method in accordance with the present invention, the pixel density transforming process may be performed by multiplying each of image signal components, which are fed out from the solid-state detecting devices corresponding to a pixel of interest and the neighboring pixels, by a predetermined coefficient, and thereafter adding values of products obtained from the multiplication. The term "pixel of interest" as used herein means the pixel, which includes the position of the pixel obtained from the pixel density transforming process, or the pixel, which is closest to the position of the pixel obtained from the pixel density transforming process.

The present invention also provides an apparatus for carrying out the radiation image read-out method in accordance with the present invention. Specifically, the present invention also provides a radiation image read-out apparatus, comprising means for obtaining an image signal, which represents a radiation image, from a solid-state radiation detector constituted of a plurality of solid-state detecting devices for detecting radiation, which are arrayed in a matrix-like form along a main scanning direction and a sub-scanning direction and each of which corresponds to one pixel, wherein the improvement comprises the provision of pixel density transforming means for performing a pixel density transforming process on the image signal and in accordance with a pixel size, which is determined in accordance with a desired image size.

In the radiation image read-out apparatus in accordance with the present invention, the pixel density transforming means should preferably perform the pixel density transforming process in accordance with a pixel density of an output apparatus, which receives an image signal having been obtained from the pixel density transforming process. For example, in cases where a pixel size of each of the solid-state detecting devices falls within the range of 100 $\mu$m to 200 $\mu$m, the pixel density transforming means should preferably perform the pixel density transforming process such that a pixel size in an image outputted from the output apparatus falls within the range of 40 $\mu$m to 100 $\mu$m. In such cases, the pixel density transforming means should more preferably perform the pixel density transforming process such that the pixel size in the image outputted from the output apparatus falls within the range of 70 $\mu$m to 90 $\mu$m.

In the radiation image read-out apparatus in accordance with the present invention, the pixel density transforming means should preferably operate such that, as an effective image size of the solid-state radiation detector becomes large, a magnification ratio of pixel density transformation in the pixel density transforming process is set to be low (i.e., the pixel density is set to be low) with respect to each of a row direction and a column direction.

Also, in the radiation image read-out apparatus in accordance with the present invention, the pixel density transforming means should preferably perform the pixel density transforming process such that, with respect to each of a row direction and a column direction, a magnification ratio of pixel density transformation is equal to n/m, where n represents a positive integral number and m represents a positive integral number equal to at most a number of pixels of the solid-state detecting devices along the main scanning direction or the sub-scanning direction.

Further, in the radiation image read-out apparatus in accordance with the present invention, the pixel density transforming means may perform the pixel density transforming process by multiplying each of image signal components, which are fed out from the solid-state detecting devices corresponding to a pixel of interest and the neighboring pixels, by a predetermined coefficient, and thereafter adding values of products obtained from the multiplication. The image signal components, which are fed out from the solid-state detecting devices, should preferably be of analog values.

The present invention further provides a solid-state radiation detector, comprising a plurality of solid-state detecting devices for detection of radiation, which are: arrayed in a matrix-like form and each of which corresponds to one pixel, and having read-out functions for feeding out a detection signal, which has been detected by the solid-state detecting devices, as an image signal, wherein the improvement comprises the provision of pixel density transforming means for performing a pixel density transforming process on the image signal and in accordance with a pixel size, which is determined in accordance with a desired image size.

In the solid-state radiation detector in accordance with the present invention, as in the aforesaid radiation image read-out method and apparatus in accordance with the present invention, the pixel density transforming means should preferably operate such that, as an effective image size of the solid-state radiation detector becomes large, a magnification ratio of pixel density transformation in the pixel density transforming process is set to be low with respect to each of a row direction and a column direction.

Also, in the solid-state radiation detector in accordance with the present invention, the pixel density transforming means should preferably perform the pixel density transforming process such that, with respect to each of a row direction and a column direction, a magnification ratio of pixel density transformation is equal to n/m, where n represents a positive integral number and m represents a positive integral number equal to at most a number of pixels of the solid-state detecting devices along the main scanning direction or the sub-scanning direction.

Further, in the solid-state radiation detector in accordance with the present invention, the pixel density transforming means may perform the pixel density transforming process by multiplying each of image signal components, which are fed out from the solid-state detecting devices corresponding to a pixel of interest and the neighboring pixels, by a predetermined coefficient, and thereafter adding values of products obtained from the multiplication. In such cases, the image signal components, which are fed out from the solid-state detecting devices, should preferably be of analog values.

In the radiation image read-out method and apparatus and the solid-state radiation detector in accordance with the present invention, the solid-state radiation detector may be one of various types of solid-state radiation detectors comprising a plurality of solid-state detecting devices for conversion of radiation into an electric signal, which are arrayed in the matrix-like form, and feeding out an image signal, which represents a radiation image. Typical examples of the solid-state radiation detectors include the photo conversion types of solid-state radiation detectors, the direct conversion types of solid-state radiation detectors, and the improved direct conversion types of solid-state radiation detectors, which will be described later. However, the solid-state radiation detector is not limited to these types of solid-state radiation detectors.

As will be described later, in the cases of the improved direct conversion types of solid-state radiation detectors, as for the solid-state radiation detector itself, it cannot be the that the individual solid-state detecting devices are arrayed in a matrix-like form. However, in the step of processing the detected image signal, for example, a signal component at a sampling point can be regarded as a signal component representing a predetermined pixel. Therefore, it can be regarded that the solid-state detecting devices are arrayed in a substantially matrix-like form so as to correspond to the pixels. The solid-state radiation detector employed in the radiation image read-out method and apparatus in accordance with the present invention may be the one, in which the individual solid-state detecting devices are arrayed in an exactly matrix-like form, or the one, in which the individual solid-state detecting devices are arrayed in a substantially matrix-like form.

The term "desired image size" as used herein means the image size, which is determined by the pixel density and the pixel size and which is required in cases where an image is outputted from a printer, or the like, by the utilization of the image signal obtained from the solid-state radiation detector or in cases where the image signal is stored in a filing apparatus.

The term "pixel density transforming process" as used herein means the process performed on the image signal made up of a series of image signal components, which have been fed out from the solid-state detecting devices corresponding to pixels, for obtaining an image signal made up of a series of image signal components, which represent pixels of a size different from the pixel size determined by the solid-state detecting devices themselves, and thereby altering the pixel density of the image signal having been fed out from the solid-state radiation detector. The pixel density transforming process embraces a pixel density lowering process, in which the pixel density is set to be low by enlarging the pixel size, and a pixel density raising process, in which the pixel density is set to be high by reducing the pixel size. The term "pixel size determined by solid-state detecting devices themselves" as used herein means the size of the detection region per pixel, which is determined by the array pitch of the solid-state detecting devices, and the like.

The term "pixel density lowering process" as used herein means the process for obtaining a new image signal made up of a series of image signal components, which represent pixels of a size larger than the pixel size determined by the solid-state detecting devices themselves, and thereby setting the pixel density to be low. By way of example, with the pixel density lowering process, a plurality of image signal components, which have been fed out from the solid-state detecting devices corresponding to a plurality of pixels adjacent to one another, may be mixed together, and the resulting image signal component may be employed as an image signal component representing a new pixel.

The term "pixel density raising process" as used herein means the process for obtaining a new image signal made up of a series of image signal components, which represent pixels of a size smaller than the pixel size determined by the solid-state detecting devices themselves, and thereby setting the pixel density to be high. By way of example, with the pixel density raising process, processing may be performed on a plurality of image signal components, which have been fed out from the solid-state detecting devices corresponding to a plurality of pixels adjacent to one another, and an image signal component representing a new pixel, which is located among the plurality of the pixels adjacent to one another, may thereby be obtained.

In the pixel density lowering process and the pixel density raising process, the image signal components corresponding to the plurality of the pixels may be weighted, and the new image signal component may be obtained from the weighted image signal components. In such cases, weight factors employed in the weighting may be set in one of various manners. For example, weight factors of an identical value may be employed for the image signal components corresponding to all of the pixels (as in simple mean calculations). Alternatively, weight factors of different values may be employed for the image signal components corresponding to different pixels (as in weighted mean calculations). Also, one of various known interpolation processing techniques, such as a nearest neighbor interpolation technique, a polynomial interpolation technique, a Lagrangean interpolation technique, a spline interpolation technique, and a combination of two or more of the above-enumerated interpolation techniques, may be employed.

The solid-state radiation detector employed in the radiation image read-out method and apparatus in accordance with the present invention is not limited to the three types of solid-state radiation detectors described above. The solid-state radiation detector may be one of various other types of solid-state radiation detectors, which have semiconductors as the major parts and are constituted of a plurality of arrayed solid-state detecting devices for detecting radiation.

With the radiation image read-out method and apparatus in accordance with the present invention, the pixel density transforming process is performed on the image signal and in accordance with the pixel size, which is determined in accordance with a desired image size. Therefore, the number of pixels in the image processed in image processing at the post stage can be set at a desired value (i.e., the image size of the image reproduced or outputted can be set approximately at a predetermined size) regardless of the effective image size of the solid-state radiation detector. For example, as the effective image size of the solid-state radiation detector becomes large, the magnification ratio of pixel density transformation in the pixel density transforming process may be set to be low with respect to each of the row direction and the column direction. In this manner, the number of pixels in the image processed in the image processing at the post stage can be set at a predetermined value or approximately at the predetermined value. Accordingly, a single image reproducing apparatus or a single image filing apparatus can be utilized for a plurality of solid-state radiation detectors of different image sizes and for a plurality of read-out image sizes varying in the logical readout.

Also, with the radiation image read-out method and apparatus in accordance with the present invention, wherein the pixel density transforming process is performed in accordance with the pixel density of the output apparatus, such as a printer, the effects described below can be obtained. Specifically, the pixel size of each of the solid-state detecting devices constituting the solid-state radiation detector can be set in accordance with the detection signal quantity (i.e., the signal-to-noise ratio) of each solid-state detecting device. Also, in the output apparatus, such as a printer, for outputting the image in accordance with the image signal having been obtained from the solid-state radiation detector, the pixel size can be set such that recording (output) scanning lines may become imperceptible. Further, the difference between the pixel size of each solid-state detecting device and the pixel size of the output apparatus can be compensated for by performing the pixel density transforming process. Therefore, in the solid-state radiation detector, the pixel size can be set at an appropriate size regardless of the image size (the pixel size) of the output apparatus. Also, in the output apparatus, the pixel size can be set at an appropriate size regardless of the image size (the pixel size) of the solid-state radiation detector.

Further, with the radiation image read-out method and apparatus in accordance with the present invention, wherein the pixel density transforming process is performed such that, with respect to each of the row direction and the column direction, the magnification ratio of pixel density transformation is equal to n/m, where n represents appositive integral number and m represents a positive integral number equal to at most a number of pixels of the solid-state detecting devices along the main scanning direction or the sub-scanning direction, the weighted operations and the interpolating operations can be performed with simple operation process. Particularly, the pixel density transforming process performed in this manner is suitable for digital signal processing. Also, since m is a positive integral number equal to at most a number of pixels of the solid-state detecting devices along the main scanning direction or the sub-scanning direction, with respect to an approximately entire image area other than the peripheral regions of the effective image size, the weighted operations and the interpolating operations can be performed by utilizing the image signal components having been obtained from the solid-state detecting devices.

Furthermore, with the radiation image read-out method and apparatus in accordance with the present invention, the pixel density transforming process may be performed by multiplying each of the image signal components, which are fed out from the solid-state detecting devices corresponding to the pixel of interest and the neighboring pixels, by a predetermined coefficient, and thereafter adding the values of products obtained from the multiplication. In such cases, the pixel density transforming process can be performed with the so-called filtering process. Particularly, the, pixel density transforming process performed in this manner is suitable for analog signal processing.

With the solid-state radiation detector in accordance with the present invention, which is provided with the pixel density transforming means for performing the pixel density transforming process described above, an integral type of solid-state radiation detector having the pixel density transforming functions can be obtained.

BRIEF DESCRIPTION OF THE DRAWINGS

FIG. 2 is an explanatory view showing the relationship between a pixel array in a solid-state radiation detector of a fundamental size and signal values of a read-out image signal, which represent the pixels.

DESCRIPTION OF THE PREFERRED EMBODIMENTS

The present invention will hereinbelow be described in further detail with reference to the accompanying drawings.

Figure 1:
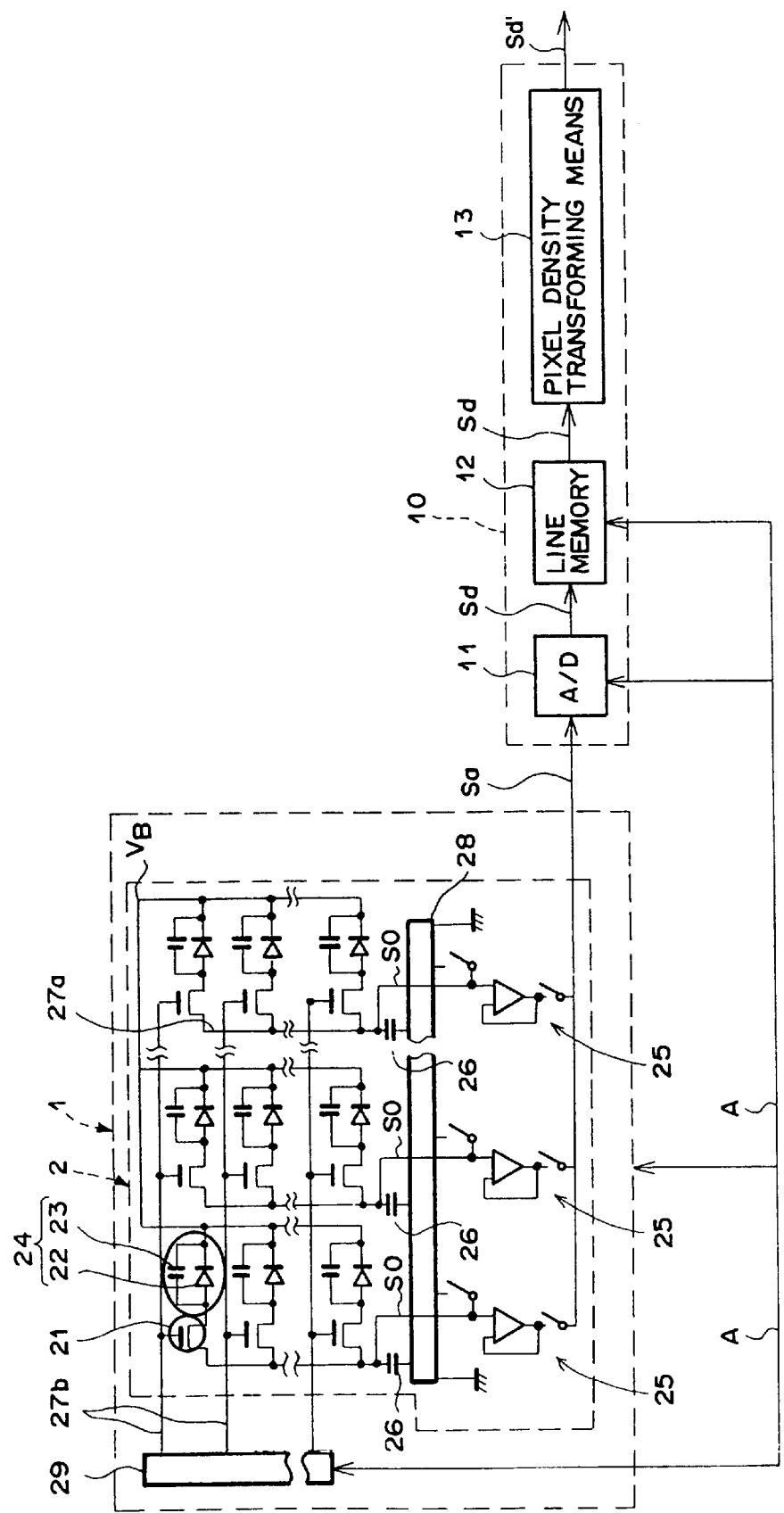
FIG. 1 is a schematic view showing an embodiment of the radiation image read-out apparatus in accordance with the present invention.

FIG. 1 is a schematic view showing an embodiment of the radiation image read-out apparatus in accordance with the present invention. AS illustrated in FIG. 1, a radiation image read-out apparatus 10 reads an image signal, which represents a radiation image, from a photo conversion type of solid-state radiation detector 1.

The solid-state radiation detector 1 comprises a scintillator (not shown), which converts the incident radiation into visible light, and a solid-state detecting section 2, which detects the visible light having been generated by the scintillator and photoelectrically converts the visible light into an image signal representing a radiation image of an object.

As illustrated in FIG. 1, the solid-state detecting section 2 comprises a plurality of photoelectric conversion devices 24, 24, . . . , which serve as solid-state detecting devices and which are arrayed in two-dimensional directions. Each photoelectric conversion device 24 is constituted of photoelectric conversion means 22, which photoelectrically converts visible light having been generated by the scintillator into an analog image signal component, and a capacitor 23, which temporarily stores signal charges (corresponding to the image signal component) generated by the photoelectric conversion means 22. Each photoelectric conversion device 24 is connected to transfer means 21, which is constituted of a TFT and which transfers the signal charges having been accumulated at the capacitor 23. The pixel size of the photoelectric conversion devices 24, 24, . . . is fixed at a predetermined value of 100 $\mu$m regardless of a difference in effective image size, which will be described later. Since the pixel size of the solid-state radiation detector 1 is fixed at the predetermined value, the read-out density of the solid-state radiation detector 1 along the main scanning direction and the read-out density of the solid-state radiation detector 1 along the sub-scanning direction are fixed at 10 pixels/mm. The photo conversion types of solid-state radiation detectors have the problems in that, if the pixel size is set to be small, the aperture rate becomes low, the sensitivity becomes low, and the signal-to-noise ratio becomes low. The pixel size of 100 $\mu$m corresponds to the highest read-out density (pixel density) among the read-out densities of the currently available photo conversion types of solid-state radiation detectors.

The solid-state detecting section 2 also comprises a plurality of output amplifiers 25, 25, . . . Each of the output amplifiers 25, 25, . . . amplifies the image signal component S0, which is fed out of each of the photoelectric conversion devices 24, 24, . . . arrayed along the vertical direction in FIG. 1. The solid-state detecting section 2 further comprises a plurality of load capacitors 26, 26, . . . Each of the load capacitors 26, 26, . . . temporarily stores the image signal component S0, which is fed out of each of the photoelectric conversion devices 24, 24, . . . arrayed along the vertical direction in FIG. 1.

As illustrated in FIG. 1, each photoelectric conversion device 24 is connected to the transfer means 21, which is constituted of a TFT and which transfers the signal charges having been accumulated at the capacitor 23. The output of each transfer means 21 is connected to a signal conductor 27a. The signal conductor 27a extends vertically in FIG. 1 and is connected to the corresponding output amplifier 25. Also, the signal conductor 27a is connected via the corresponding load capacitor 26 to a multiplexer 28. The gate of each transfer means 21 is connected to a scan conductor 27b. The scan conductor 27b extends horizontally in FIG. 1 and is connected to a scan pulse generator 29. A cathode side of each photoelectric conversion device 24 is connected to an internal power source VB.

As described above, the signal conductor 27a and the scan conductor 27b are connected to the TFT constituting the transfer means 21. In accordance with scanning control performed by the multiplexer 28 and the scan pulse generator 29, the image signal components S0, S0, . . . generated by the photoelectric conversion devices 24, 24, . . . corresponding to predetermined pixels are successively fed out from the output amplifiers 25, 25, . . . In this manner, a read-out image signal Sa is fed out from the solid-state radiation detector 1.

The radiation image read-out apparatus 10 comprises pixel density transforming means 13 for performing a pixel density transforming process, which will be described later, on the read-out image signal Sa received from the solid-state radiation detector 1. The radiation image read-out apparatus 10 also comprises an analog-to-digital converter 11 for converting the read-out image signal Sa into a digital image signal Sd, and a line memory 12 for storing the digital image signal Sd. In FIG. 1, A represents an address signal. A sampling period in the analog-to-digital converter 11 is set at a period corresponding to the read-out density and is fixed regardless of the effective image size.

How the radiation image read-out apparatus 10 operates will be described hereinbelow.

With a radiation image recording apparatus (not shown), a radiation image is recorded on the solid-state radiation detector 1. Also, the scanning control is performed by the multiplexer 28 and the scan pulse generator 29, and the analog read-out image signal Sa representing the radiation image is fed out from the solid-state radiation detector 1. The analog-to-digital converter 11 digitizes the read-out image signal Sa with a predetermined scale factor. The thus obtained digital read-out image signal Sd is successively stored in the line memory 12 having a capacity corresponding to, for example, several main scanning lines. The read-out image signal Sd is then read in units of predetermined main scanning lines from the line memory 12 and fed into the pixel density transforming means 13.

How the pixel density transforming means 13 performs the pixel density transforming process will be described hereinbelow.

By way of example, how the image signals representing the radiation images are read out from a solid-state radiation detector, which has an effective image size equal to a fundamental size, and solid-state radiation detectors having vertical sizes and horizontal sizes, which are respectively equal to predetermined multiples of the vertical size and the horizontal size in the fundamental size. In cases where a radiation image is read out from a conventional stimulable phosphor sheet, on which the radiation image has been stored, the term "effective image size" as used herein corresponds to the size of the stimulable phosphor sheet. In cases where a logical readout is performed on a solid-state radiation detector of a size fixed at a predetermined size, the term "effective image size" as used herein corresponds to the read-out image size. When necessary, the size of the solid-state radiation detector may be altered in accordance with the effective image size.

FIG. 2 shows the relationship between the pixel array in the solid-state radiation detector of the fundamental size and signal values (pixel values) x$\alpha\beta$ of the read-out image signal Sd, which represent the pixels. In this case, x$\alpha\beta$ represents the signal value corresponding to each pixel, $\alpha$ represents the pixel number assigned along the sub-scanning direction, and $\beta$ represents the pixel number assigned along the main scanning direction. The pixel size in the main scanning direction and the pixel size in the sub-scanning direction are defined by the array pitch of the solid-state detecting devices constituting the solid-state radiation detector. In this example, the fundamental size is 200 mm×250 mm, and the number of pixels (main scanning direction×sub-scanning direction) is 2,000×2,500.

The pixel density transforming means 13 may perform the pixel density transforming process such that, as the effective image size of the solid-state radiation detector 1 becomes large, the magnification ratio of pixel density transformation is set to be low with respect to each of the row direction and the column direction. How the pixel density transforming process is performed will be described hereinbelow. The term "setting a magnification ratio of pixel density transformation to be low" as used herein means that the pixel density is lowered. Also, the term "magnification ratio of pixel density transformation" as used herein means the degree of lowering of the pixel density, i.e. the rate of lowering of the pixel density. Consequently, the term "as an effective image size becomes large, a magnification ratio of pixel density transformation is set to be low" as used herein means that, as the effective image size of the solid-state radiation detector 1 becomes large, the rate of lowering of the pixel density is set to be high. Specifically, the term "setting a rate of lowering to be high" as used herein means that, in cases where the magnification ratio of pixel density transformation is represented by 1/N, the value of the numerator "N" is set to be large. When the magnification ratio is to be set, m and n may be set at positive integral numbers, and at least m may be set at a positive integral number equal to at most the number of pixels of the solid-state detecting devices along the main scanning direction or the sub-scanning direction. The magnification ratio may thereby set at n/m. Thereafter, a divisor may be taken, and 1/N may thus be set.

In an example, the effective image size of the solid-state radiation detector 1 along each of the main scanning direction and the sub-scanning direction may be approximately two times as large as the fundamental size along each of the main scanning direction and the sub-scanning direction. For example, the effective image size of the solid-state radiation detector 1 may be 425 mm×425 mm, 350 mm×425 mm, or 350 mm×350 mm. In such cases, the pixel density transforming process is performed in the manner described below.

Figure 3:
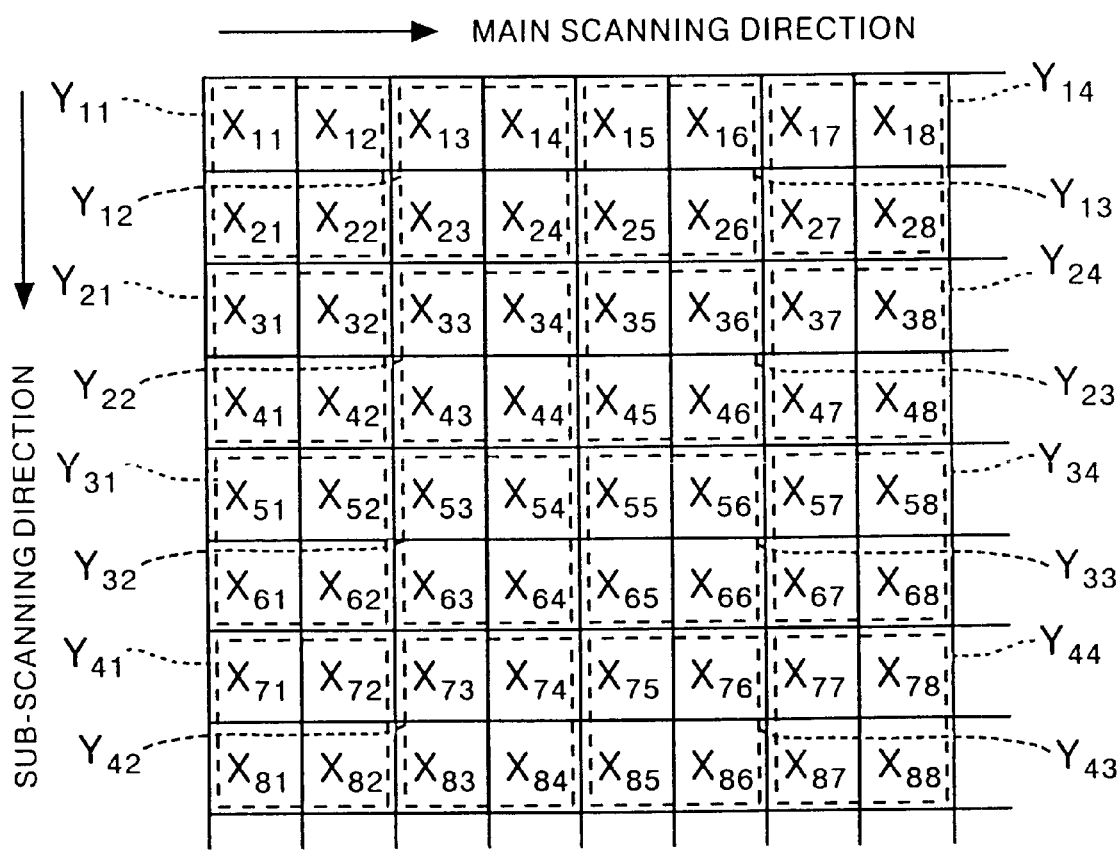
FIG. 3 is an explanatory view showing an example of a pixel density lowering process, in which a pixel density in each of main scanning and sub-scanning directions is lowered to approximately 1/2.

The pixel density transforming means 13 performs a pixel density lowering process, with which the pixel density is set to be low, on the read-out image signal Sd having been obtained from the solid-state radiation detector 1. With the pixel density lowering process, a new image signal component representing one pixel is obtained from the image signal components of the read-out image signal Sd, which represent four pixels adjacent to one another. Specifically, a mean value of the signal values corresponding to four adjacent pixels (i.e., two pixels located along the main scanning direction x two pixels located along the sub-scanning direction) is calculated and taken as the signal value corresponding to one pixel. FIG. 3 shows an array of the image signal components of the read-out image signal Sd, which represent adjacent pixels. In FIG. 3, each of the image signal components of the read-out image signal Sd is indicated by the solid lines. With the pixel density lowering process, by way of example, new signal values $Y_{11}, y_{12}, \ldots Y_{21}, \ldots$, each of which is indicated by the broken lines in FIG. 3, are calculated with the formulas shown below.

$$y_{11}=(x_{11}+x_{12}+x_{21}+x_{22})/4$$

$$y_{12}=(x_{13}+x_{14}+x_{23}+x_{24})/4$$

$$\vdots$$

$$y_{21}=(x_{31}+x_{32}+x_{41}+x_{42})/4$$

$$\vdots$$

In this case (and in the examples which will be described later), yαβ represents the signal value corresponding to each pixel having been obtained from the pixel density transforming process (in this case, the pixel density lowering process), α represents the pixel number of the pixel, which has been obtained from the pixel density transforming process, assigned along the sub-scanning direction, and β represents the pixel number of the pixel, which has been obtained from the pixel density transforming process, assigned along the main scanning direction.

As a result, the pixel size becomes equal to 200 μm. Also, with respect to each of the main scanning direction and the sub-scanning direction, the pixel density in the image represented by a processed image signal Sd', which has been obtained from the pixel density transforming process, is lowered to one half of the pixel density in the pixel array of the fundamental size and becomes equal to 5 pixels/mm.

In another example, the effective image size of the solid-state radiation detector 1 along each of the main scanning direction and the sub-scanning direction may be approximately 1.5 times as large as the fundamental size along each of the main scanning direction and the sub-scanning direction. For example, the effective image size of the solid-state radiation detector 1 may be 250 mm×300 mm. In such cases, the pixel density transforming process is performed in the manner described below.

Figure 4:
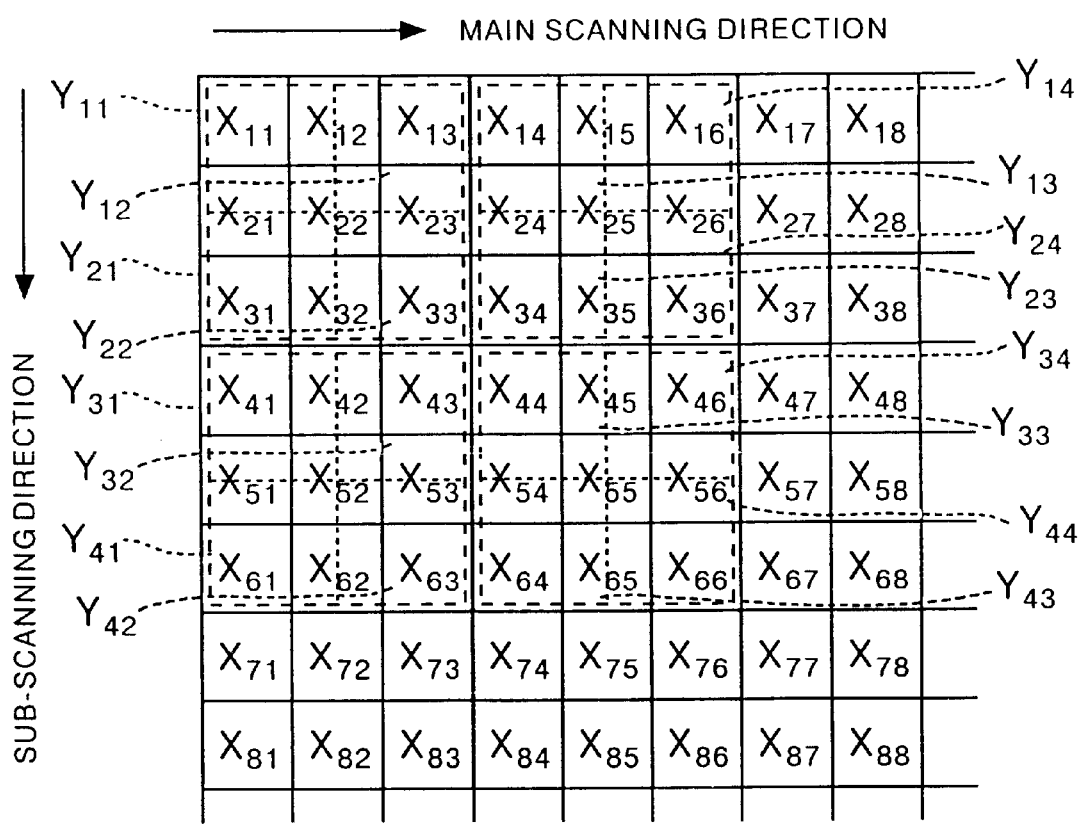
FIG. 4 is an explanatory view showing an example of the pixel density lowering process, in which the pixel density in each of main scanning and sub-scanning directions is lowered to approximately 2/3.

The pixel density transforming means 13 performs a pixel density lowering process, with which the pixel density is set to be low, on the read-out image signal Sd having been obtained from the solid-state radiation detector 1. With the pixel density lowering process, new signal values corresponding to four pixels are obtained from the signal values of the read-out image signal Sd, which correspond to nine pixels adjacent to one another. Specifically, a mean value of the signal values corresponding to 1.5 pixels along each of the main scanning direction and the sub-scanning direction is calculated and taken as the signal value corresponding to one pixel. FIG. 4 shows an array of the image signal components of the read-out image signal Sd, which represent adjacent pixels. In FIG. 4, each of the image signal components of the read-out image signal Sd is indicated by the solid lines. With the pixel density lowering process, by way of example, new signal values $y_{11}, y_{12}, \ldots, y_{21}, \ldots$, each of which is indicated by the broken lines in FIG. 4, are calculated with the formulas shown below.

$$y_{11}=(4x_{11}+2x_{12}+2x_{21}+x_{22})/9$$

$$y_{12}=(4x_{13}+2x_{12}+2x_{23}+x_{22})/9$$

$$\vdots$$

$$y_{21}=(4x_{31}+2x_{21}+2x_{32}+x_{22})/9$$

$$\vdots$$

In the formulas shown above, the signal values xαβ corresponding to the respective pixels are multiplied by the predetermined coefficients (i.e., 4, 2, 2, and 1 from the left side of each formula). The thus obtained products are added to one another, and the resulting addition value is divided by the total sum (i.e., 9) of the coefficients. In this manner, the degrees of contribution of the pixels to the processed signal values yαβ are taken into consideration. For example, as will be found from FIG. 4, as for $Y_{11}$, in cases where the degree of contribution of $x_{22}$ is taken as 1, the degree of contribution of $x_{11}$ is equal to 4, and the degree of contribution of each of $x_{12}$ and $x_{21}$ is equal to 2.

As a result, the pixel size becomes equal to 150 μm. Also, with respect to each of the main scanning direction and the sub-scanning direction, the pixel density in the image represented by a processed image signal Sd', which has been obtained from the pixel density transforming process, is lowered to 2/3 of the pixel density in the pixel array of the fundamental size and becomes equal to 20 pixels/3 mm.

In the examples described above, the effective image size of the solid-state radiation detector 1 along each of the main scanning direction and the sub-scanning direction is approximately 2 times or 1.5 times as large as the fundamental size along each of the main scanning direction and the sub-scanning direction. Alternatively, the effective image size of the solid-state radiation detector 1 along each of the main scanning direction and the sub-scanning direction may be approximately 3 times, 4 times, and the like, as large as the fundamental size along each of the main scanning direction and the sub-scanning direction. For example, in cases where the effective image size of the solid-state radiation detector 1 along each of the main scanning direction and the sub-scanning direction is 4 times as large as the fundamental size along each of the main scanning direction and the sub-scanning direction, the pixel size becomes equal to 400 $\mu$m. Also, with respect to each of the main scanning direction and the sub-scanning direction, the pixel density in the image represented by a processed image signal Sd', which has been obtained from the pixel density transforming process, is lowered to 1/4 of the pixel density in the pixel array of the fundamental size and becomes equal to 2.5 pixels/mm.

With the pixel density transforming process described above, the number of pixels (main scanning direction x sub-scanning direction) in the image represented by the processed image signal Sd' becomes equal to 2,125×2,125 as for the effective image size of 425 mm×425 mm, 1,750×2,125 as for the effective image size of 350 mm×425 mm, 1,750×1,750 as for the effective image size of 350 mm×350 mm, and 1,666×2,000 as for the effective image size of 250 mm×300 mm. Specifically, regardless of the effective image size, the number of pixels in the image represented by the processed image signal Sd' can be kept to be approximately equal to a predetermined value. As for the fundamental size of 200 mm×250 mm, the pixel density transformation is not performed, and the number of pixels is kept to be 2,000×2,500.

The number of pixels in the image represented by the processed image signal Sd' varies slightly in accordance with the effective image size. However, even if the processed image signals Sd', Sd', . . . varying slightly in the number of pixels are fed into a single image reproducing apparatus or a single image filing apparatus, no problems will occur. Therefore, a single image reproducing apparatus or a single image filing apparatus can be utilized for a plurality of solid-state radiation detectors of different image sizes and for a plurality of read-out image sizes varying in the logical readout.

As described above, with the embodiment of the radiation image read-out apparatus in accordance with the present invention, the pixel density transforming process is performed on the image signal, which has been received from the solid-state radiation detector, and in accordance with the effective image size. Therefore, the number of pixels in the image processed in image processing, or the like, at the post stage can be set at a predetermined value or approximately at the predetermined value regardless of the effective image size of the solid-state radiation detector. Accordingly, a single image reproducing apparatus or a single image filing apparatus can be utilized for a plurality of solid-state radiation detectors of different image sizes and for a plurality of read-out image sizes varying in the logical readout.

In the embodiment described above, simple mean values are calculated by considering the degrees of contribution of the pixels to the processed signal values y$\alpha\beta$. Alternatively, a weighted mean process may be performed. Specifically, each of the pixel values of the adjacent pixels may be multiplied by a predetermined weight factor, and the values of products obtained from the multiplication may be added to one another. Thereafter, the resulting sum is divided by the total sum of the values of the weight factors. For example, in cases where the pixel density lowering process is performed, in which a single pixel is constituted from a pixel group comprising an odd number of pixels located along the main scanning direction x an odd number of pixels located along the sub-scanning direction, a large weight factor may be assigned to a pixel close to the center of the pixel group. In this manner, a processed image, in which the pixels close to the center of the pixel group have been enhanced, can be obtained.

In the examples described above, the processed image signal can be obtained from the pixel density transforming process, in which the addition and the division are performed, or the pixel density transforming process, in which the weighted addition and the division are performed. In cases where the pixel density transforming process is performed such that, with respect to each of the main scanning direction and the sub-scanning direction, the magnification ratio of pixel density transformation is equal to n/m, where n represents a positive integral number and m represents a positive integral number equal to at most the number of pixels of the solid-state detecting devices along the main scanning direction or the sub-scanning direction, (e.g., 6/7), the processed image signal can be obtained with simple operations. Also, since each of m and n is an integral number, the pixel density transforming process performed in this manner is suitable for digital signal processing.

Also, in the examples described above, n and m are set such that n<m, and the pixel density lowering process for setting the pixel density to be low is thus performed. Alternatively, n and m may be set such that n>m, and the pixel density raising process for setting the pixel density to be high may thereby be performed. An example of the pixel density raising process will hereinbelow be described briefly.

In this example of the pixel density raising process, the pixel density raising process is performed such that the pixel size of each pixel in the image, which is outputted by a printer serving as the output apparatus, falls within the range of 70 $\mu$m to 90 $\mu$m regardless of the pixel size of each of the photoelectric conversion devices 24, 24, . . . , i.e. such that the outputted image is adapted to the pixel density of the printer.

In cases where a solid-state radiation detector, in which the pixel size of each of the photoelectric conversion devices 24, 24, . . . falls within the range of 140 $\mu$m to 180 $\mu$m, n/m may be set at 2/1. In cases where a solid-state radiation detector, in which the pixel size of each of the photoelectric conversion devices 24, 24, . . . falls within the range of 122.5 $\mu$m to 157.5 $\mu$m, n/m may be set at 7/4. Also, in cases where a solid-state radiation detector, in which the pixel size of each of the photoelectric conversion devices 24, 24, . . . falls within the range of 105 $\mu$m to 135 $\mu$m, n/m may be set at 3/2.

In such cases, as the pixel density transforming process, an interpolating operation process, with which the number of pixels in the image represented by the image signal obtained from the transformation increases to n/m times as large as the number of pixels in the image represented by the image signal obtained from the solid-state radiation detector, may be employed.

Figure 5:
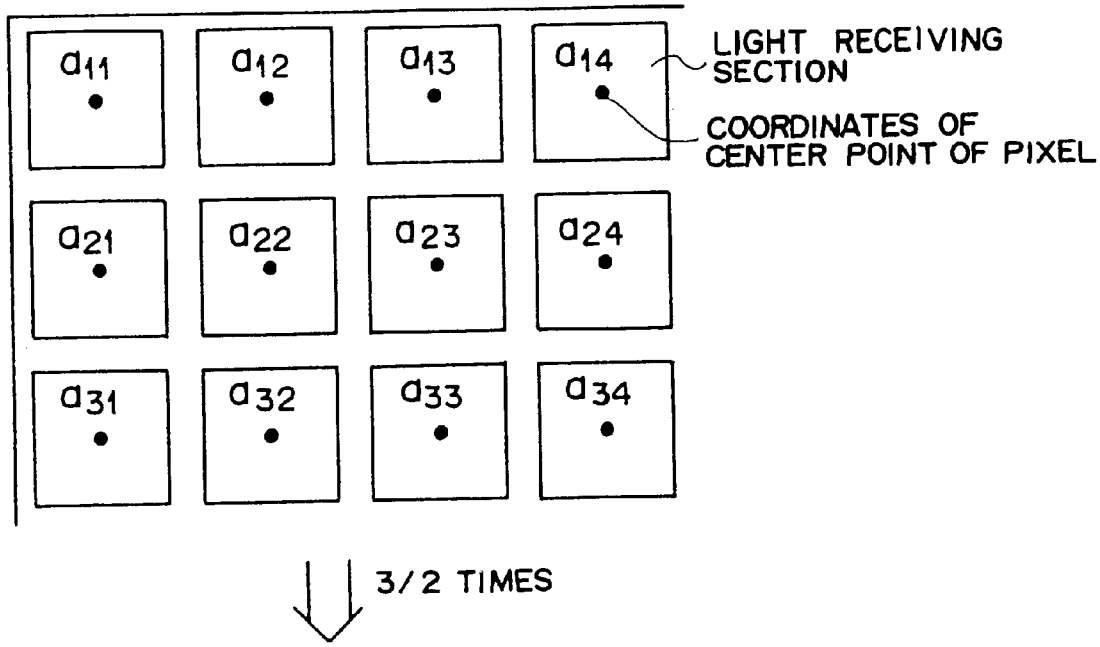
FIG. 5 is an explanatory view showing relationship between pixel positions before a pixel density transforming process and pixel positions after the pixel density transforming process in cases where a magnification ratio of pixel density transformation is equal to 3/2.
Figure 5:
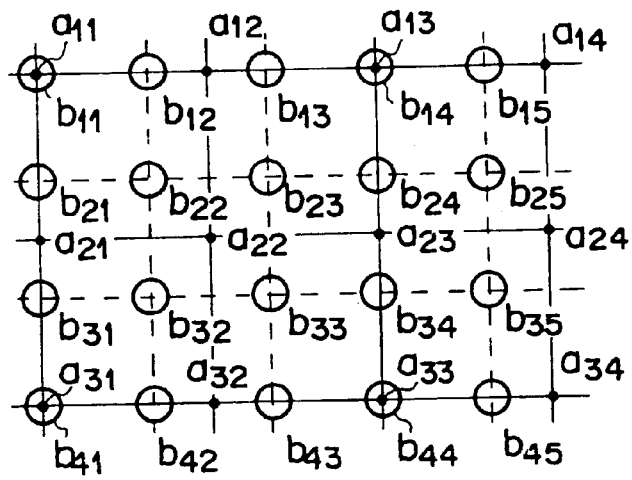

FIG. 5 is an explanatory view showing relationship between pixel positions of pixels apq before the pixel density transforming process and pixel positions of pixels bpq after the pixel density transforming process in cases where the magnification ratio n/m of pixel density transformation is equal to 3/2. By way of example, in cases where a signal value corresponding to a pixel $b_{22}$ after the transformation is to be calculated, the interpolating operation process is performed by utilizing signal values corresponding to pixels $a_{11}$, $a_{12}$, $a_{21}$, and $a_{22}$ before the transformation, which are located in the vicinity of the pixel $b_{22}$ after the transformation. Also, in the interpolating operation process, in cases where the signal value (the pixel value) corresponding to each pixel after the transformation, which pixel is set newly, is to be calculated, the degrees of contribution of the signal values, which correspond to the pixels before the transformation, to the signal value corresponding to the pixel after the transformation, which pixel is set newly, should preferably be taken into consideration. For example, in cases where the signal value corresponding to the pixel $b_{22}$ after the transformation is to be calculated, weighted operations should preferably be performed by considering the distance between the pixel $b_{22}$ and each of the pixels $a_{11}$, $a_{12}$, $a_{21}$, and $a_{22}$.

As described above, in cases where the pixel density transforming process is performed in accordance with the pixel density of the printer, the pixel size of each of the solid-state detecting devices can be set such that no problem with regard to the signal-to-noise ratio may occur due to the level of the pixel value obtained from each solid-state detecting device. Also, in the printer, the pixel size can be set at a desired pixel size. For example, in cases where a diagnosis is to be made with respect to the chest of a human body, it is necessary for the pixel size of each solid-state detecting device to be at most 200 μm. Also, if the pixel size of each solid-state detecting device is smaller than 100 μm, the signal quantity per pixel becomes small, and the signal-to-noise ratio cannot be kept high. Therefore, as the solid-state radiation detector, a detector should preferably be employed, in which the pixel size of each solid-state detecting device falls within the range of 100 μm to 200 μm. In cases where the image outputted by the printer is to be obtained such that the recording scanning lines may be imperceptible, it is necessary for the pixel size in the outputted image (the printer pixel size) to be at most 100 μm and preferably to be at most 90 μm. Also, if the printer pixel size is smaller than the range of 40 μm to 70 μm, the problems will occur in that the capacity of an image memory cannot be kept small. Therefore, a printer should preferably be employed, in which the printer pixel size falls within the range of 40 μm to 100 μm. A printer should more preferably be employed, in which the printer pixel size falls within the range of 70 μm to 90 μm. With the embodiment of the radiation image read-out apparatus in accordance with the present invention, the pixel size in the solid-state radiation detector can be set at an appropriate size regardless of the pixel size of the printer, and the pixel size in the printer can be set at an appropriate size regardless of the pixel size of the solid-state radiation detector. Therefore, the embodiment of the radiation image read-out apparatus in accordance with the present invention can sufficiently satisfy the requirements described above.

In the examples described above, the read-out density of the solid-state radiation detector along the main scanning direction and the read-out density of the solid-state radiation detector along the sub-scanning direction are identical with each other. Also, the pixel density along the main scanning direction and the pixel density along the sub-scanning direction, which pixel densities have been obtained from the pixel density transforming process, are identical with each other. Alternatively, the read-out density of the solid-state radiation detector along the main scanning direction and the read-out density of the solid-state radiation detector along the sub-scanning direction may be different from each other. Also, the pixel density along the main scanning direction and the pixel density along the sub-scanning direction, which pixel densities have been obtained from the pixel density transforming process, may be different from each other.

The pixel density transforming process described above can also be accomplished with analog signal processing in which, for example, addition processing utilizing resistance addition and division (or multiplication) processing utilizing a divider (or a multiplier) are performed.

Figure 6:
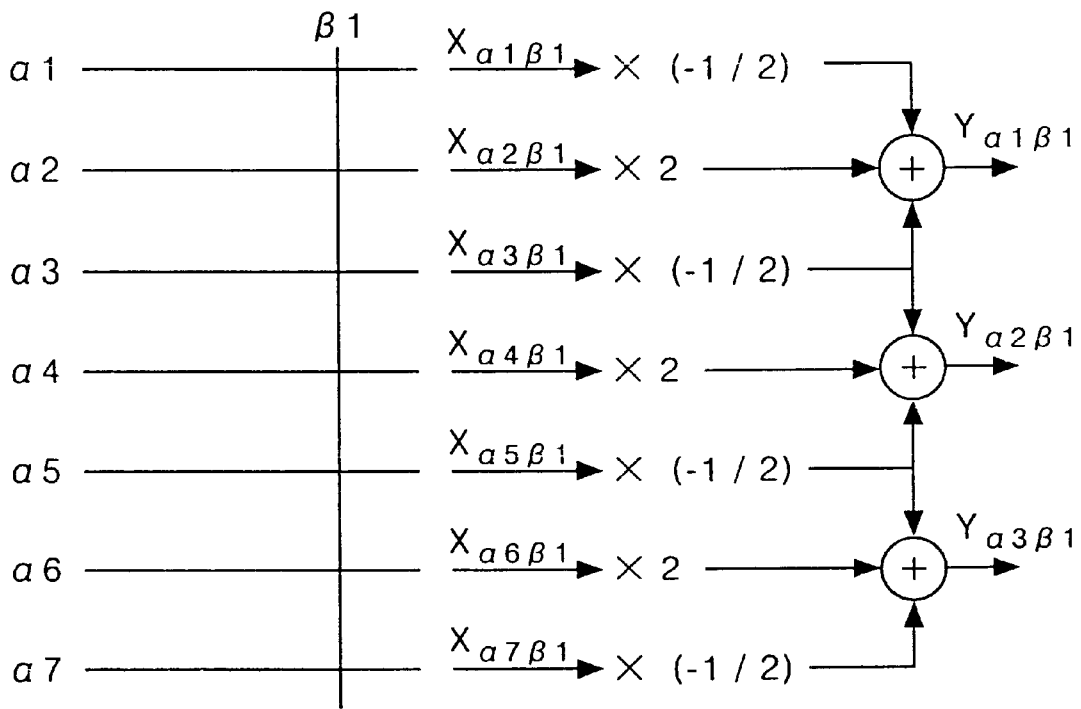
FIG. 6 is an explanatory view showing a different example of the pixel density lowering process.

The pixel density transforming process employed in the radiation image read-out apparatus in accordance with the present invention is not limited to the process in which the magnification ratio of pixel density transformation is equal to n/m, where n represents a positive integral number and m represents a positive integral number equal to at most the number of pixels of the solid-state detecting devices along the main scanning direction or the sub-scanning direction. Specifically, in the radiation image read-out apparatus in accordance with the present invention, the pixel density transforming process may be performed with one of various other processes, which are performed on the image signal made up of a series of image signal components, which have been fed out from the solid-state detecting devices corresponding to pixels, for obtaining an image signal made up of a series of image signal components, which represent pixels of a size different from the pixel size determined by the solid-state detecting devices themselves, and thereby altering the pixel density of the image signal having been fed out from the solid-state radiation detector. FIG. 6 shows an example of such a process.

FIG. 6 is an explanatory view showing the process, wherein each of the image signal components, which are fed out from the solid-state detecting devices corresponding to a pixel of interest and the pixels adjacent to the pixel of interest along the sub-scanning direction, is multiplied by a predetermined coefficient, the values of products obtained from the multiplication are then added to one another, and the pixel density along the sub-scanning direction is thereby set to be low.

In the example shown in FIG. 6, calculations are made with the formulas shown below by utilizing signal values $x\alpha_1\beta_1$ through $x\alpha_7\beta_1$ corresponding to seven pixels assigned with a pixel number $\beta 1$ with respect to the main scanning direction and pixel numbers $\alpha 1$ through $\alpha 7$ with respect to the sub-scanning direction. From the calculations, signal values $y\alpha_1\beta_1$, $y\alpha_2\beta_1$, and $y\alpha_3\beta_1$, which corresponding to three new pixels, areobtained. In this manner, the pixel density is set to be low.

$$y\alpha_1\beta_1=(-\tfrac{1}{2})x\alpha_1\beta_1+2x\alpha_2\beta_1+(-\tfrac{1}{2})x\alpha_3\beta_1$$

$$y\alpha_1\beta_1=(-\tfrac{1}{2})x\alpha_3\beta_1+2x\alpha_4\beta_1+(-\tfrac{1}{2})x\alpha_5\beta_1$$

$$y\alpha_1\beta_1=(-\tfrac{1}{2})x\alpha_5\beta_1+2x\alpha_6\beta_1+(-\tfrac{1}{2})x\alpha_7\beta_1$$

:

Specifically, the pixels located along the sub-scanning direction are taken alternately as the pixel of interest (in this example, each of the odd-numbered pixels is taken as the pixel of interest). The signal values of the pixel of interest and two pixels adjacent to the pixel of interest along the sub-scanning direction (i.e., the signal values of the three total pixels) are utilized, and one pixel value is calculated with the operation processing shown above from the signal values of the three pixels. In this manner, the pixel density is set to be low. In this example, the pixel value of the pixel of interest is multiplied by 2, the pixel value of each of the two adjacent pixels is multiplied by (−½), and the resulting three products are added to one another. As a result, a processed image, in which the pixel of interest has been enhanced, can be obtained.

The process described above can be accomplished with a filtering process and is suitable for processing, particularly, an analog signal. It is also possible to perform digital operation processing.

In the example described above, one pixel value is calculated from the pixel values corresponding to the pixel of interest and the pixels adjacent to the pixel of interest along the sub-scanning direction, and the pixel density along the sub-scanning direction is thereby set to be low. As for the main scanning direction, the pixel density can be set to be low with the same process as that described above.

In the embodiment described above, the photo conversion type of solid-state radiation detector is employed. In cases where a direct conversion type of solid-state radiation detector is employed, the same process as that described above can be utilized. Specifically, in the radiation image read-out apparatus in accordance with the present invention, one of various types of solid-state radiation detectors, each of which comprises a plurality of solid-state detecting devices arrayed in a matrix-like form, may be employed.

An embodiment, in which an improved direct conversion type of solid-state radiation detector is employed, will be described hereinbelow.

As described above, the improved direct conversion type of solid-state radiation detector utilizes a photo reading technique for performing the reading operation by the scanning with reading light. In the cases of the improved direct conversion type of solid-state radiation detector, as for the solid-state radiation detector itself, it cannot be the that the individual solid-state detecting devices are arrayed exactly in a matrix-like form. However, in the steps of detecting the image signal and processing the detected image signal, for example, a signal component at a sampling point can be regarded as a signal component representing a predetermined pixel. Therefore, it can be regarded that a plurality of the solid-state detecting devices are arrayed in a substantially matrix-like form so as to correspond to the pixels.

In the improved direct conversion type of solid-state radiation detector, by way of example, the reading of the radiation image may be performed with a technique, wherein the reading electrode is constituted of comb tooth-shaped electrodes (i.e., stripe-shaped electrodes), and the stripe-shaped electrodes are scanned with light, which is produced by a line light source extending along a direction approximately normal to the longitudinal direction of each stripe-shaped electrode, the scanning with the light being performed in the longitudinal direction of each stripe-shaped electrode.

In cases where the improved direct conversion type of solid-state radiation detector, in which the reading technique described above is utilized, is employed, though details of the constitution of the radiation image read-out apparatus are not described herein, the direction, along which the stripe-shaped electrodes stand side by side, corresponds to the main scanning direction in the embodiment described above, and the direction of the scanning with the light produced by the line light source corresponds to the sub-scanning direction in the embodiment described above. Also, the pixel size along the main scanning direction is defined by the array pitch of the stripe-shaped electrodes, and the pixel size along the sub-scanning direction is defined by the sampling period (line period) along the sub-scanning direction. For example, in cases where the array pitch of the stripe-shaped electrodes is equal to 50 μm, the pixel size along the main scanning direction is equal to 50 μcm. In such cases, if the sampling period along the sub-scanning direction is set such that the intervals in terms of the length may be equal to 50 μm, the pixel size of each solid-state detecting device constituting the solid-state radiation detector can be regarded as being 50 μm × 50 μm. As described above, with the currently available photo conversion types of solid-state radiation detectors, the smallest possible pixel size is 100 μm. However, with the improved direct conversion type of solid-state radiation detector, the pixel size can be set to be as small as 50 μm.

In cases where the improved direct conversion type of solid-state radiation detector, in which the reading technique described above is utilized, is employed, the relationship between the pixel array in the solid-state radiation detector of the fundamental size and the signal values xaβ of the read-out image signal Sd, which represent the pixels, may be considered as being identical with the relationship shown in FIG. 2. In this case, xαβ represents the signal value corresponding to each pixel, α represents the sampling number assigned along the sub-scanning direction, i.e. the pixel number assigned along the sub-scanning direction, and β represents the electrode number of each stripe-shaped electrode, i.e. the pixel number assigned along the main scanning direction.

Therefore, in cases where the improved direct conversion type of solid-state radiation detector is employed, the pixel density transforming process may be performed in the same manner as that in the aforesaid embodiment utilizing the photo conversion type of solid-state radiation detector. For example, the mean value of the signal values corresponding to four adjacent pixels (i.e., two pixels located along the main scanning direction x two pixels located along the sub-scanning direction) may be calculated and taken as the signal value corresponding to one pixel. In this manner, with respect to each of the main scanning direction and the sub-scanning direction, the pixel density in the image represented by the processed image signal Sd', which has been obtained from the pixel density transforming process, can be lowered to one half of the pixel density in the pixel array of the fundamental size. The two pixels located along the main scanning direction correspond to two stripe-shaped electrodes. The two pixels located along the sub-scanning direction correspond to two sampling periods along the sub-scanning direction, i.e. two lines. In the cases of the improved direct conversion type of solid-state radiation detector, particularly, the resolution transforming process shown in FIG. 6 utilizing the filtering process should preferably be employed.

In the embodiments of the radiation image read-out apparatus in accordance with the present invention, the pixel density transforming means 13 for performing the pixel density transforming process on the image signal, which has been obtained from the solid-state radiation detector, is provided as means separate from the solid-state radiation detector. Alternatively, the pixel density transforming means may be located in the solid-state radiation detector. In this manner, the solid-state radiation detector having the pixel density transforming functions and the functions of the read-out apparatus may be constituted.

What is claimed is:

1. A radiation image read-out method, comprising the steps of obtaining an image signal, which represents a radiation image, from a solid-state radiation detector constituted of a plurality of solid-state detecting devices for detecting radiation, which are arrayed in a matrix-like form along a main scanning direction and a sub-scanning direction and each of which corresponds to one pixel, wherein the improvement comprises the step of performing a pixel density transforming process on the image signal and in accordance with a pixel size, which is determined in accordance with a desired image size, wherein said pixel density transforming process is performed in accordance with a pixel density of an output apparatus, which receives an image signal having been obtained from said pixel density transforming process, wherein a pixel size of each of the solid-state detecting devices falls within the range of 100 $\mu$m to 200 $\mu$m, wherein said pixel density transforming process is performed such that the pixel size in the image outputted from said output apparatus falls within the range of 70 $\mu$m to 90 $\mu$m.

2. A method as defined in claim 1 wherein, as an effective image size of the solid-state radiation detector becomes large, a magnification ratio of pixel density transformation in said pixel density transforming process is set to be low with respect to each of a row direction and a column direction.

3. A method as defined in claim 1 wherein said pixel density transforming process is performed such that, with respect to each of a row direction and a column direction, a magnification ratio of pixel density transformation is equal to n/m, where n represents a positive integral number and m represents a positive integral number equal to at most a,number of pixels of the solid-state detecting devices along the main scanning direction or the sub-scanning direction.

4. A radiation image read-out apparatus, comprising means for obtaining an image signal, which represents a radiation image, from a solid-state radiation detector constituted of a plurality of solid-state detecting devices for detecting radiation, which are arrayed in a matrix-like form along a main scanning direction and a sub-scanning direction and each of which corresponds to one pixel, wherein the improvement comprises the provision of pixel density transforming for performing a pixel density transforming process on the image signal and in accordance with a pixel size, which is determined in accordance with a desired image size, wherein said pixel density transforming means performs said pixel density transforming process in accordance with a pixel density of an output apparatus, which receives an image signal having been obtained from said pixel density transforming process, wherein a pixel size of each of the solid-state detecting devices falls within the range of 100 $\mu$m to 200 $\mu$m, and wherein said pixel density transforming means performs said pixel density transforming process such that the pixel size in the image outputted from said output apparatus falls within the range of 70 $\mu$m to 90 $\mu$m.

5. An apparatus as defined in claim 4 wherein said pixel density transforming means operates such that, as an effective image size of the solid-state radiation detector becomes large, a magnification ratio of pixel density transformation in said pixel density transforming process is set to be low with respect to each of a row direction and a column direction.

6. An apparatus as defined in claim 4 wherein said pixel density transforming means performs said pixel density transforming process such that, with respect to each of a row direction and a column direction, a magnification ratio of pixel density transformation is equal to n/m, where n represents a positive integral number and m represents a positive integral number equal to at most a number of pixels of the solid-state detecting devices along the main scanning direction or the sub-scanning direction.

* * * * *